(12) United States Patent
Powell et al.

(10) Patent No.: US 11,190,094 B2
(45) Date of Patent: Nov. 30, 2021

(54) MAGNETICALLY GEARED APPARATUS

(71) Applicant: Magnomatics Limited, Sheffield (GB)

(72) Inventors: David Powell, Sheffield (GB); Ferran Garcia Daras, Sheffield (GB); Gregg Wilson, Sheffield (GB); Robert Barrett, Sheffield (GB)

(73) Assignee: Magnomatics Limited, Yorkshire (GB)

( * ) Notice: Subject to any disclaimer, the term of this patent is extended or adjusted under 35 U.S.C. 154(b) by 602 days.

(21) Appl. No.: 16/068,764

(22) PCT Filed: Jan. 5, 2017

(86) PCT No.: PCT/GB2017/050013
§ 371 (c)(1),
(2) Date: Jul. 9, 2018

(87) PCT Pub. No.: WO2017/121987
PCT Pub. Date: Jul. 20, 2017

(65) Prior Publication Data
US 2019/0028015 A1 Jan. 24, 2019

(30) Foreign Application Priority Data

Jan. 13, 2016 (GB) .................................. 1600653
Jan. 13, 2016 (GB) .................................. 1600657

(51) Int. Cl.
*H02K 49/10* (2006.01)
*H02K 5/24* (2006.01)
(52) U.S. Cl.
CPC ............. *H02K 49/102* (2013.01); *H02K 5/24* (2013.01)

(58) Field of Classification Search
CPC .............................. H02K 49/102; H02K 5/24
See application file for complete search history.

(56) References Cited

U.S. PATENT DOCUMENTS

| 2011/0012458 A1 | 1/2011 | Atallah et al. |
| 2011/0121672 A1* | 5/2011 | Calverley ............... H02K 7/11 310/103 |
| 2011/0227441 A1 | 9/2011 | Ifrim et al. |
| 2014/0167546 A1 | 6/2014 | Sutani et al. |

(Continued)

FOREIGN PATENT DOCUMENTS

| DE | 2405678 A1 | 8/1975 |
| EA | 014510 | 12/2010 |
| EP | 2840678 A2 | 2/2015 |

(Continued)

OTHER PUBLICATIONS

The GB Search Report dated Nov. 14, 2016, for GB application No. GB1600653.8, 5 pages.

(Continued)

*Primary Examiner* — Jue Zhang
(74) *Attorney, Agent, or Firm* — Lee & Hayes, P.C.

(57) ABSTRACT

A magnetically geared apparatus comprising a rotor, the rotor comprising: a ring structure; and at least one pole piece mounted relative to the ring structure; wherein at least a portion of the ring structure forms a continuous ring radially inner to the at least one pole piece, wherein the at least one pole piece is received in a pole piece-receiving portion, the pole piece receiving portion being open at a radially outer end.

18 Claims, 7 Drawing Sheets

(56) References Cited

U.S. PATENT DOCUMENTS

2015/0075886 A1    3/2015  Tonari et al.

FOREIGN PATENT DOCUMENTS

| GB | 2516644 A | 4/2015 |
|----|-----------|--------|
| JP | 2006050755 | 2/2016 |
| WO | WO2009138728 A2 | 11/2009 |
| WO | WO2015003928 A2 | 1/2015 |

OTHER PUBLICATIONS

The GB Search Report dated Nov. 18, 2016, for GB application No. GB1600657.9, 3 pages.
Invitation to Pay Additional Fees and, Where Applicable, Protest Fee dated Apr. 20, 2017 for PCT/GB2017/050013, 14 pages.
The PCT Search Report dated Jun. 14, 2017 for PCT application No. PCT/GB2017//050013, 5 pages.
Examination Report for Application No. GB1813166.4, dated Jul. 22, 2021, 4 pages.

\* cited by examiner

MAGNETICALLY GEARED APPARATUS

This application is a national stage application of an international patent application PCT/GB2017/050013, filed Jan. 5, 2017, which claims priority to Great Britain Application No. 1600657.9, filed on Jan. 13, 2016, and Great Britain Application No. 1600653.8, filed on Jan. 13, 2016, all of which are hereby incorporated by reference in their entirety.

FIELD

The disclosure relates to a magnetically geared apparatus.

BACKGROUND

Existing magnetically geared devices utilise a modulating or pole-piece rotor to act both as a modulator for the electromagnetic field and to transfer torsional electromagnetic forces on the individual pole-pieces to motive power on an output shaft.

The pole-piece rotor of such a magnetically geared device may comprise a number of steel pole-pieces arranged in a radial array. Forces on the pole-pieces must be reacted in order to transfer torque from the pole-pieces to an output shaft or flange.

In some existing magnetically geared devices, a composite structure is used to react the forces generated on the pole-pieces. FIG. 1 shows an existing rotor built up from multiple composite parts (pultruded unidirectional beams or multi-directional fibre beams) and laminated high permeability steel pole-pieces. The composite beams are bonded to the high permeability steel pole-pieces to form a cylinder which reacts the torsional output load of the motor. Hence, for the rotor to remain torsionally and radially stiff, the adhesive bonds between the composite beams and the laminated steel pole-pieces must also be relatively stiff. Although this provides a torsionally stiff rotor, it also provides very little damping, and hence, resonant modes of the cylinder are relatively undamped.

One solution to this problem is to increase the stiffness of the rotor such that the modes that have been identified to cause significant vibration in the rotor will occur outside the operating speed range of the motor. However, this is not always possible and, as many applications of magnetically geared devices require variable speed operation, it is possible that the rotor will be driven through or operate at a resonant modal frequency.

SUMMARY

In general, in at least certain examples relating to a first aspect, the present solution provides a pole piece rotor having a continuous radially inner portion and pole piece-receiving locations open at radially outer portions. As the pole piece-receiving locations are open at radially outer portions, there is no continuous radially outer structure of the rotor that is radially outer to the open pole piece-receiving locations. Pole pieces inserted in the pole-piece receiving locations may lie flush with a radially outer surface of the rotor. By virtue of the absence any radially outer structure, the pole-pieces may be closer to the stator, and therefore closer to the stator magnets. Therefore the air gap between the pole pieces and the stator magnets is minimised.

Further, the air gap between the pole pieces and the stator magnets may be force air cooled, and an outer structure that is radially outer to the pole pieces would be detrimental to heat transfer. Heat transfer is therefore improved by virtue of the open pole piece-receiving locations being open at radially outer portions.

In a first aspect, a magnetically geared apparatus comprises a rotor having radially inner and outer surfaces, the rotor comprising: a ring structure; and at least one pole piece mounted relative to the ring structure; wherein at least a portion of the ring structure forms a continuous ring radially inner to the at least one pole piece, wherein the at least one pole piece is received in a pole piece-receiving portion, the pole piece receiving portion being open at a radially outer end.

Optionally, a radially outer surface of the at least one pole piece provides the radially outer surface.

Optionally, the portion of the ring structure is an inner ring structure. The at least one pole piece may comprise a plurality of pole pieces, and the inner ring structure may be radially inner to all the pole pieces.

Optionally, the pole piece-receiving portion comprises walls extending radially for receiving the at least one pole piece. The walls may not extend into the portion, or the walls may extend only partially into the portion.

Optionally, the pole piece-receiving portion and the at least one pole piece are shaped to provide a mechanical keying of the at least one pole piece in the pole-piece receiving portion. The mechanical keying may be such that outward radial movement of the at least one pole piece is restricted.

Optionally, the rotor may provide a monocoque structure.

Optionally, the walls comprise a circumferential spacing therebetween, the walls being inclined towards the radially inner surface.

Optionally, the ring structure is integrally formed. The ring structure may be of one-piece construction.

In general, in at least certain examples relating to a second aspect, the present solution provides a pole piece rotor having a continuous radially inner portion formed from composite material. The material may comprise a plurality of fibres extending in different, non-parallel directions. One of these directions may be between a circumferential direction and an axial direction. The other of these directions may also be between a circumferential and an axial direction.

In the second aspect, a magnetically geared apparatus comprises a rotor, the rotor comprising: a ring structure; wherein at least a portion of the ring structure is formed from composite material comprising: a first plurality of fibres extending substantially in a first direction and a second plurality of fibres extending substantially in a second direction, the first direction and the second direction being non-parallel and the first direction and/or second direction being between a circumferential direction and an axial direction.

Optionally, the ring structure is an inner ring structure, and wherein rotor further comprises an outer ring structure that is radially outer, the second ring structure having a pole piece-receiving portion therein.

Optionally, the inner and outer ring structures are concentric.

Optionally, the pole piece-receiving portion comprises walls extending radially through the outer ring structure. The walls may extend radially through the entirety of a radial width of the outer ring structure.

Optionally, the first and second crossed fibres form a layer in the inner ring structure.

Optionally, the outer ring structure is formed from composite material comprising a third plurality of fibres extending substantially in a third direction different from the first and/or second directions. The outer ring structure may further comprises a fourth plurality of fibres, the third and fourth plurality of fibres being aligned in respective third and fourth orientations, at least one of the third and fourth orientations being different to the first and second orientations. At least one of the third and fourth orientations may be aligned substantially along the axial direction, and the other of the third and fourth orientations may be aligned substantially along the circumferential direction.

Optionally, the third and fourth orientations are separated by an angle of substantially 90°.

Optionally, the third plurality of fibres comprise chopped strands of fibres.

Optionally, at least one of the third plurality of fibres extends at least partly, and optionally substantially, radially. The third plurality fibres may form a three-dimensional weave.

Optionally, the axis of rotation of the rotor defines a Z axis, and wherein the first orientation is between 0° and 90° with respect to the XY plane, and the second orientation is between 0° and −90° with respect to the XY plane. The first orientation may be between 5° and 85°, and optionally the second orientation may be between −5° and −85°. The first orientation may be between 10° and 80°, and optionally the second orientation may be between −10° and −80°. The first orientation may be between 15° and 75°, and optionally the second orientation may be between −15° and −75°. The first orientation may be between 30° and 60°, and optionally the second orientation may be between −30° and −60°. The first orientation may be substantially 45°, and the second orientation may be substantially −45°.

Optionally, the first and second orientations are separated by an angle of substantially 90°.

Optionally, the walls of the pole piece-receiving portion do not extend into the inner ring structure. Alternatively, the walls may extend part of the way through a radial width of the inner ring structure.

Optionally, the pole piece-receiving portion has a length and a width, the length being greater than the width, and the length extending in the axial direction.

Optionally, the rotor is formed from a filament winding, a roll-wrap or a resin transfer mould technique.

Optionally, the fibres of the inner ring structure and the outer ring structure are different materials.

Optionally, the fibres of the inner ring structure are E-glass, S-glass, Kevlar, Carbon-fibre or natural fibres Optionally, the inner ring structure is radially internal to the outer ring structure.

Optionally, the inner and outer ring structures are bonded or mechanically fixed together. The inner and outer ring structures may comprise a screw passing radially through the inner and outer ring structures, and a nut on one end of the screw to mechanically fix the inner and outer ring structures together. Additionally or alternatively, the inner and outer ring structures comprise a screw passing radially through the outer ring structure into a blind hole in the inner ring structure, thereby mechanically fixing the inner and outer ring structures together. The blind hole may have means for retaining the screw, for example a tapped hole or insert.

Optionally, the pole piece-receiving portion receives at least one pole piece therein. A surface of the at least one pole piece may form at least part of the radially outer surface of the rotor.

Optionally, the pole piece-receiving portion and the at least one pole piece are shaped to provide a mechanical keying of the at least one pole piece in the pole piece-receiving portion. The mechanical keying may be such that outward radial movement of the at least one pole piece is restricted.

Optionally, the walls of the pole piece-receiving portion comprise a circumferential spacing therebetween, the walls being inclined towards the radially inner surface.

Optionally, in the first or second aspect, the pole piece-receiving portion has a cross section in a plane substantially perpendicular to the axis of rotation of the rotor that is substantially trapeziform, and the at least one pole piece has a cross section in a plane substantially perpendicular to the axis of rotation of the rotor that is substantially trapeziform. Alternatively, the pole piece-receiving portion has a cross section in a plane substantially perpendicular to the axis of rotation of the rotor that is substantially diamond-shaped, and the at least one pole piece has a cross section in a plane substantially perpendicular to the axis of rotation of the rotor that is substantially diamond-shaped. Other complementary shapes of pole pieces and pole piece-receiving portions are possible, as long as the result is mechanical keying.

Optionally, in the first or second aspect, the walls of the pole piece-receiving portion comprise a circumferential spacing therebetween, the pole piece-receiving portion further comprising a wedge between one of the walls and the at least one pole piece. Such walls of the pole piece-receiving portion may, in this case, may be parallel. The wedge may have a radially extending wall inclined towards the radially inner surface.

Optionally, in the first or second aspect, the rotor further comprises damping material and wherein, when the damping material is at a temperature within a range of 0° C. to 150°, the damping material has a loss factor greater than 0.1. The loss factor may be greater than 1.

Optionally, when the damping material is at a temperature within the range, the damping material has a Young's modulus between 1 MPa and 100 MPa. The damping material may have a Young's modulus between 1 MPa and 30 MPa.

Optionally, in the first or second aspect, herein the damping material is provided between at least one pole piece received in the pole piece-receiving portion and the pole piece-receiving portion. The damping material may be provided between radially extending walls of the at least one pole piece and the walls of the pole piece-receiving portion. Additionally or alternatively, the damping material may be provided between a radially inner surface of the pole piece and the pole piece-receiving portion.

Optionally, in the first or second aspect, the damping material comprises a tape, a post-cured pourable fluid, a mouldable putty, a loaded rubber, a visco-elastic or a visco-plastic.

Optionally, in the first or second aspect, the damping material comprises a plurality of different materials having different values of the loss factor and/or the Young's modulus. The different materials may be axially, circumferentially or radially layered.

Optionally, in the first or second aspect, the damping material is provided in a cavity of at least one pole piece. The cavity may be completely enclosed by the pole piece. Alternatively, the cavity may be in communication with an exterior of the pole piece.

Optionally, in the first or second aspect, the cavity comprises a slot extending towards a surface of the at least one pole piece. The slot may comprise a first slot extending radially, and a second slot extending circumferentially.

Optionally, in the first or second aspect, the cavity comprises a diagonal slot oblique to the radial direction.

Optionally, in the first or second aspect, the cavity comprises one or more internal slots, each slot dividing the at least one pole piece into a plurality of pole pieces. The plurality of pole pieces may be enclosed by the damping material.

Optionally, in the first or second aspect, the at least one pole piece comprises a laminated pole piece. The laminated pole piece may be formed of laminate sheets layered axially or radially. The pole piece may further comprise damping material between the laminate sheets.

Optionally, in the first or second aspect, the at least one pole piece comprises a plurality of axially adjacent pole pieces. The pole piece may further comprise damping material between the axially adjacent pole pieces.

Optionally, in the first or second aspect, the at least one pole piece comprises a plurality of pole piece portions, the pole piece portions being radially layered on top of each other. The pole piece portions may comprise inner and outer pole piece portions, the outer pole piece portion forming a shell radially outer of the inner pole piece portion. The plurality of pole piece portions may comprise 2 or more pole piece portions, for example 3 pole piece portions.

Optionally, in the first or second aspect, the rotor comprises first and second end plates at opposite axial ends of the rotor, the first and second end plates being fixed to the ring structure.

Optionally, the first (inner) ring structure is of one-piece construction. The first (inner) and second (outer) ring structures may be of one-piece construction.

The magnetically geared apparatus may be a motor/generator.

The magnetically geared apparatus may provide magnetic gearing between an input shaft and an output shaft, one of the input shaft and output shaft comprising the rotor.

In the first or second aspect, the apparatus may further comprise: another rotor comprising a first plurality of permanent magnets; a stator comprising a second plurality of permanent magnets and windings; wherein the rotor is arranged to interact with the another rotor in a magnetically geared manner; and wherein the windings are arranged to magnetically interact with the first or fundamental harmonic of the magnetic field of the first plurality of permanent magnets.

Optionally, in the first or second aspect, the first plurality of permanent magnets has a respective first number of pole-pairs, and the second plurality of permanent magnets has a respective second number of pole-pairs, wherein the at least one pole piece is arranged to modulate the magnetic fields of the first and second pluralities of permanent magnets to produce mutually matching pole-pairs, thereby enabling magnetic coupling and torque transmission between the first and second pluralities of permanent magnets, and wherein the windings are arranged to magnetically couple with the first or fundamental harmonic of the magnetic field of the first plurality of permanent magnets.

In the first or second aspect, the rotor and the another rotor may be configured to transfer torque therebetween in a magnetically geared manner. Optionally, the rotor is mechanically coupled to one of an input or output shaft, and the another rotor is mechanically coupled to the other of an input or output shaft.

FIGURE LISTING

Specific embodiments in which the invention is embodied are described below by way of example only and with reference to the accompanying drawings, in which.

DETAILED DESCRIPTION

Figure 1:
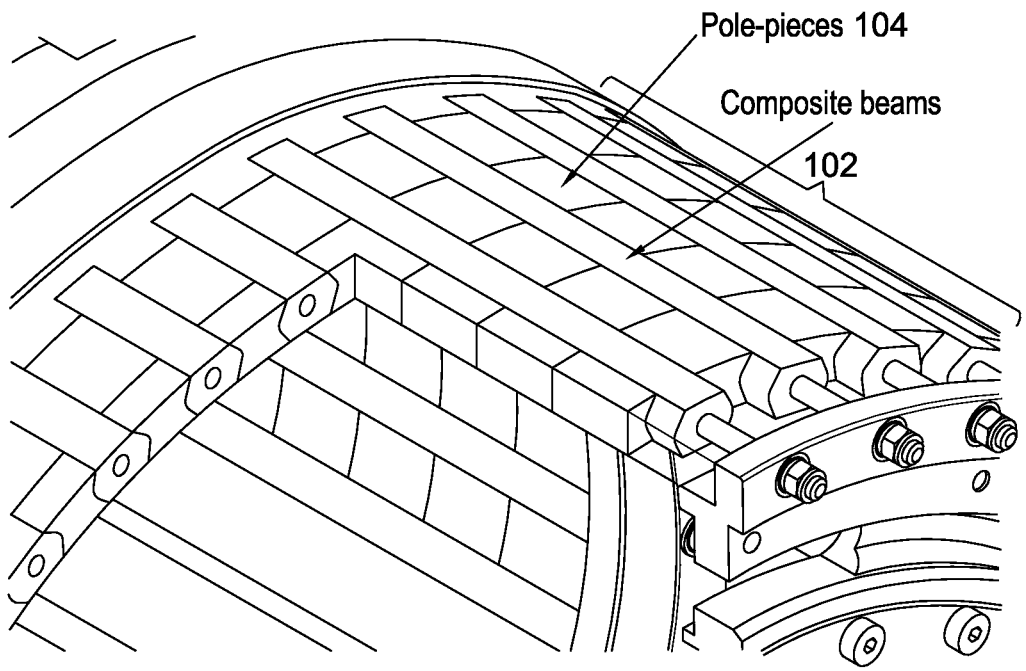
FIG. 1 is a perspective view of a prior art rotor.

A rotor for a magnetically geared device may contain pole-pieces, and thus be termed a pole-piece rotor. Such pole-pieces may be fixed to or within slots of the rotor by an adhesive. FIG. 1 shows such a pole-piece rotor. If we consider a pole-piece rotor 102 having the structure shown in FIG. 1, and including a compliant adhesive to fix pole-pieces 104 to the rotor 102, it is evident that both the torsional stiffness of the pole-piece rotor 102 and the cylinder wall radial stiffness of the pole-piece rotor 102 will be low, and as such the rotor 102 will have limited utility in terms of the load carrying capability due to the large displacements that would occur. Pole-pieces in a pole-piece rotor, such as the pole-piece rotor 102, are subjected to large forces due to the torque being reacted (circumferential force) and also due to forces acting radially due to the magnetic attraction from magnets located radially inner and radially outer of the pole-piece rotor. As the pole-piece rotor rotates, the magnitude of these forces changes and these forces can act together on the rotor structure to excite various mode shapes in the rotor. Such excitation happens when the exciting frequencies at a given speed coincide with the natural modes of the rotor, causing a resonance. Resonance can lead to undesired vibrations/deflections of the rotor structure, causing high acoustic noise levels and also potential fatigue and premature failure of the structure. In variable speed applications, such as a rotor for a magnetically geared device, this can be a significant issue as such exciting frequencies can be difficult to avoid.

It is often not possible to make the structure of the pole-piece rotor stiff enough to avoid excitation of the resonant modes. Therefore, it has been realised that the introduction of damping material into the pole-piece rotor can act to dampen the undesired motions/vibrations of the pole-piece rotor, decreasing the amplitude of such motions/ vibrations. This is by virtue of the motion/vibration energy being dissipated into the damping material.

Figure 2:
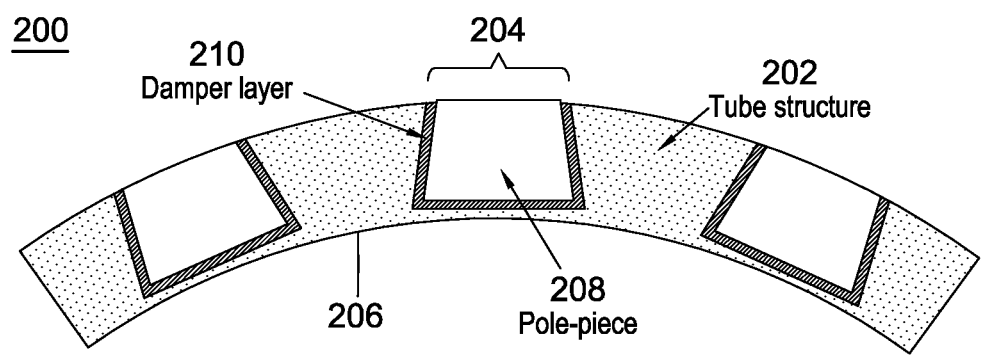
FIG. 2 is an axial view of an embodiment of a rotor for a magnetically geared apparatus.

FIG. 2 shows an embodiment of a pole-piece rotor 200. The rotor 200 may be constructed from a single tube 202 (ideally non-metallic) with machined slots 204. The rotor 200 could also be constructed from a number of parts to build up the geometry shown in FIG. 2. Such a rotor 200 may be used as part of a magnetically geared apparatus having a stator with a relatively high number of magnetic poles, the pole piece rotor 200 and an inner rotor having a relatively low number of magnetic poles. The inner rotor is a high-speed rotor. Alternatively, the high-speed rotor could be an outer rotor.

An important part of this type of rotor construction is that a torque tube is retained on the inner surface 206 of the rotor 200. The skilled person would understand that, in the context of a rotor, a torque tube is a thickness of the rotor wall that is capable of transmitting/reacting the full torque experienced by the rotor. Such a torque tube has sufficient torsional stiffness to prevent excessive twisting of the rotor. Torque tubes are conventionally used as a reaction tube around a main propulsion or drive shaft, and can also be used as a hollow, lightweight propeller shaft. Torque tubes are often engineered to maximise torsional stiffness, rather than bending stiffness.

The advantage of having the torque tube on the inner surface 206 is that, compared to the system's sensitivity to the air gap between the pole-pieces 208 and the stator, the system is less sensitive to the magnetic air gap between the pole-pieces 208 and the high-speed low-pole inner rotor. Extending the outer gap between the pole-pieces 208 and the high pole number outer stator or array would significantly reduce the air gap shear-stress and hence reduce the torque capability of the magnetic gear. This is predominantly due to the ratio of magnet pole width to the air gap length and results in higher levels of magnetic leakage i.e. flux which goes from magnet-to-magnet without crossing the air gap. Perhaps more precisely put, the flux is not in the correct orientation in the air gap to contribute to the production of a tangential force and hence torque. As such, having the torque tube on the inner surface of the rotor 200 allows the air gap between the pole-pieces 208 and the stator to be reduced, increasing the torque capability of the magnetic gear.

This torque tube is torsionally stiff, and is capable of reacting the maximum torsional load without additional support from the laminated pole-pieces (unlike the rotor 102 in FIG. 1 which does not have a torque tube). The high permeability pole-pieces 208 are placed in the slots 204 as shown in FIG. 2. The pole-piece slots 204 provide a means of carrying the pole-pieces 208 on the rotor 200, and the slots 204 may also form a non-re-entrant shape for the pole-piece 208 so it cannot exit the rotor 200 under high loads (electromagnetic or centrifugal). The combination of a torque tube to react the torsional load and non-re-entrant slots 204 to hold the pole-pieces 208 allows the pole-pieces 208 to be used to transfer loads without needing to contribute to the overall rotor structure torsional stiffness. In the known device of FIG. 1, the pole-pieces 104 do need to contribute to the overall rotor structure torsional stiffness due to the absence of a torque tube.

By virtue of the pole-pieces 208 not needing to contribute to the overall rotor structure torsional stiffness, it is possible to introduce a layer of compliant (low modulus) damping material 210 between the pole-piece 208 and the composite structure 202, as shown in FIG. 2.

Figure 3:
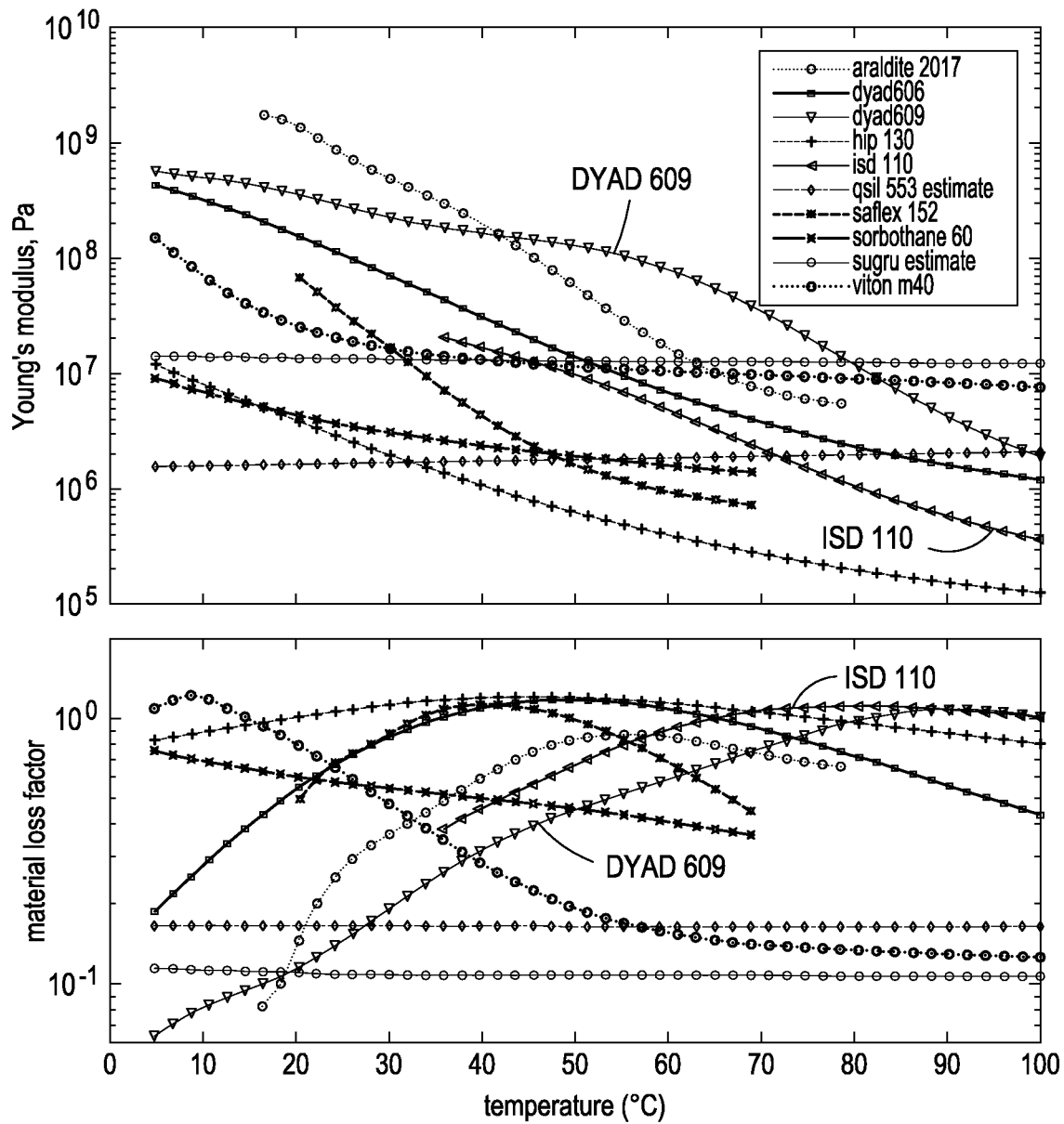
FIG. 3 is two graphs showing how Young's modulus and material loss factor vary with temperature for a variety of materials.

Damping materials may be selected based on a multi-physical set of parameters:
Loss factor over application operating temperature range
Young's modulus over application operating temperature range
Maximum and minimum operating temperatures
Bonding compatibility with other materials
Young's modulus and loss factor parameters for a range of materials are shown in FIG. 3 over a large temperature range.

The working temperature range for the pole-piece rotor is between the minimum defined ambient temperature and the maximum operating temperature in service. This range is between 0° C. and 150° C., and thus it is immediately clear from FIG. 3 that the physical properties for both loss factor and Young's modulus show significant variations over this range. By considering the practical operating temperature range for a magnetically geared system, for example a magnetically geared motor or generator used as an industrial drive, transportation (for example a rail traction motor or a marine propulsion motor) or renewable energy systems (for example wind or marine current turbine generators), after a few hours of operation, which will be between 50 and 150° C., it can be seen that some of the damping materials are more stable than others.

The loss factor (sometimes termed tan-delta) is a measure of the hysteretic damping under deformation in a given material. Elastomeric materials can have high loss factors (~1.0) and are useful as dampers and isolators. The equation below shows how the loss factor may be calculated:

$$\eta = \frac{2C}{C_0} = 2z$$

Where $\eta$ is the loss factor, $C$ and $C_0$ are the actual damping coefficient and critical damping coefficient, respectively, and $z$ is the damping ratio.

From FIG. 3 it is clear that DYAD 609 and ISD 110 exhibit high loss factors in the 50-100° C. temp range. DYAD 609 is a known constrained layer damping polymer manufactured by Soundcoat. ISD 110 is a known viscoelastic damping polymer.

It is important to consider how the vibration energy is dissipated within the damper. Firstly, to impart energy to a visco-elastic damper, there must be relative movement. The amount of movement is determined partly by the overall geometry and applied forces and partly by the Young's modulus of the damping material. The amount of energy dissipated in the damping material due to this relative movement (for instance shear) is a function of the loss factor. Hence, the Young's modulus and material loss factor must be chosen for a specific application (and temperature range) with care. A useful loss factor could be 0.1 or above, where >0.9 is seen as high. A typical useful Young's modulus for this application is between 1 MPa and 100 MPa, and preferably between 1 MPa and 30 MPa. This is extremely low when compared to conventional structural adhesives, which are typically between 0.1 GPa and 10 GPa.

The use of different damping materials for any one of the pole-pieces, or using multiple materials for each pole-piece (either layered in parallel or in series to produce a single layer) should be considered, as it will be an advantage to provide damping over a wide temperature range as typical applications will require the magnetically geared system (for example a magnetically geared motor/generator) to "start-up" from cold and operate without delay, such as rail propulsion.

The damping layer 210 of the embodiment of FIG. 2 is typically a material with a high loss factor (tan-delta) and is securely attached to both the pole-piece 208 and the structure 202 by an adhesive or other means. The resonant wall-bending modes that can be excited in a pole-piece rotor result in relative motion between the pole-piece 208 and the composite structure 202 during operation. The damping layer 210 between the pole-piece 208 and the structure 202 is then subjected to a shearing force which may comprise a number of harmonics due to the electromagnetic excitation forces of the magnetic gear. This results in dynamic shearing in the damping layer. The loss factor of the material dictates the proportion of the energy that is dissipated in the layer during shearing (kinetic energy from the vibrations is reduced to heat energy in the damping layer). The amount of damping is a function of the material shear modulus, the loss factor and the thickness of the damper layer.

The rotor 200 comprises a tube structure 202 which may be manufactured from a single-piece composite tube or other non-metallic tube with machined slots 204. The tube structure 202 may be constructed using a resin-transfer mould technique where no, or minimal post-machining is required. The tube structure 202 may be manufactured from multiple parts to provide a rotor with a torque tube feature and slots 204 to hold the pole-pieces 208.

The slots 204 in the tube 202 may be trapezoidal or another shape (round, diamond, hexagon etc., etc.) which results in mechanical keying of the pole-piece shape (i.e. the pole-pieces 208 are unable to be removed from the structure in the radial direction).

Figure 4:
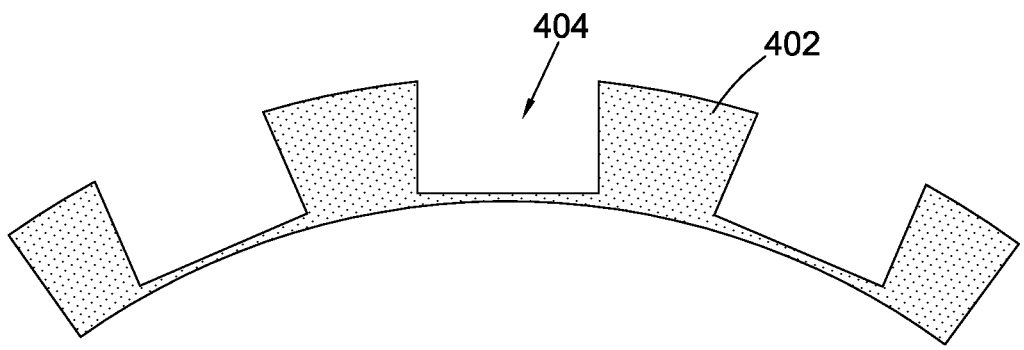
FIG. 4 is an axial view of another embodiment of a rotor for a magnetically geared apparatus, with various elements absent.
Figure 5:
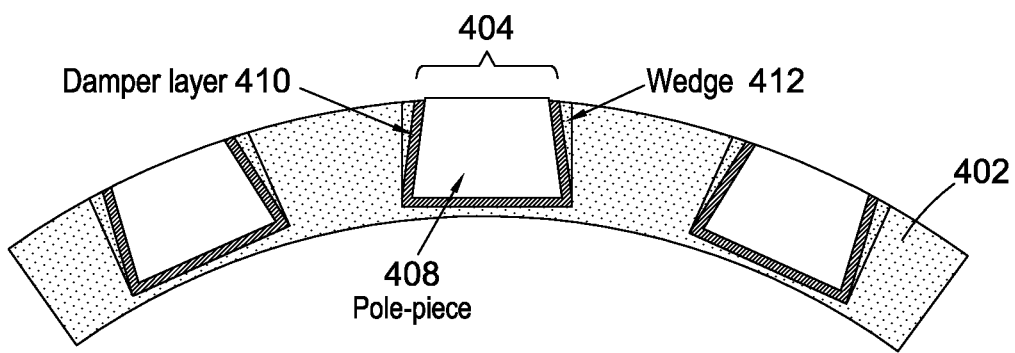
FIG. 5 is another axial view of the rotor of FIG. 4, with further elements shown.
Figure 6:
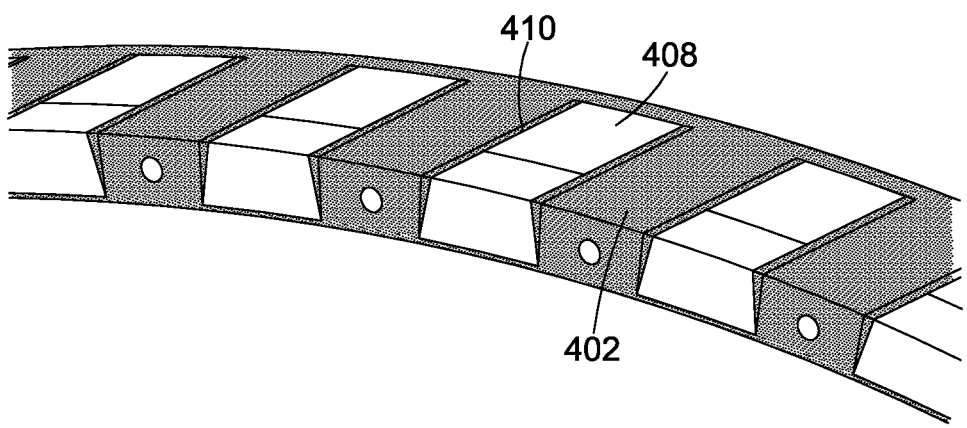
FIG. 6 is a perspective view of the rotor of FIG. 5.

In an embodiment shown in FIGS. 4-6, the slots 404 may be parallel sided to allow insertion of the pole-pieces 408 (see FIG. 5) from the top of the slot 404 (inserted in a radial direction). The circumferential gap between the pole-piece 408 and the parallel sided slot wall in the tube structure 402 is then filled with a non-metallic wedge 412 as shown in FIGS. 4 and 5. The damper layer 410 is fixed between the pole-piece 408 and the wedge 412. The interface between the wedge 412 and the tube structure 402 is hard bonded or made secure (see FIGS. 5 and 6).

In an embodiment, the pole-pieces may be trapezoidal in shape or another shape which results in mechanical keying of the pole-piece shape in the slot.

Figure 7:
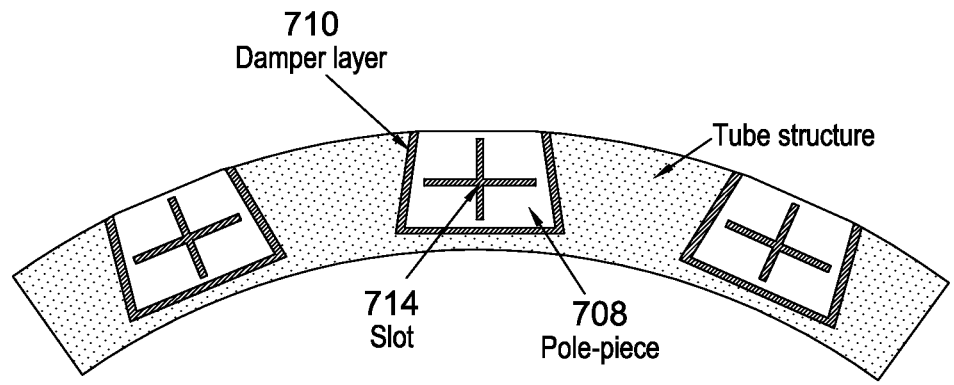
FIG. 7 is an axial view of another embodiment of a rotor for a magnetically geared apparatus.

In an embodiment shown in FIG. 7, pole-pieces 708 may be provided with slots 714 therein that do not penetrate the periphery of the pole-piece 708. The pole-pieces 708 still remain as a single part. The slot pattern may be a cruciform as shown in FIG. 7 or comprise a number of slots which are internal to the geometry of the pole-piece 708 (do not break through the outer edge of the pole-piece 708). As the pole-pieces 708 still remain as a single part, it is easier to maintain tolerances when compared to multi-part pole-pieces (such as the pole-pieces 808, described below). Therefore, the thickness of the damper layer 710 may be more precisely controlled. As the skilled person would understand, the thickness of the damper layer 710 is an important parameter in calculating damping coefficients, and as such the damping coefficients may be more accurately calculated for a single part pole-piece. Further, the use of single part pole-pieces reduces the number of components to be handled compared to multi-part pole-pieces.

Figure 8:
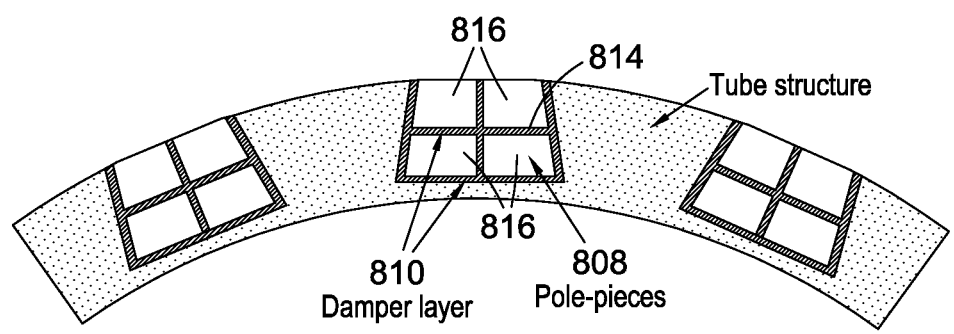
FIG. 8 is an axial view of another embodiment of a rotor for a magnetically geared apparatus.

In an embodiment shown in FIG. 8, the pole-pieces 808 may be split in to a number of individual parts 816. The parts 816 may have damping material 810 between them and also around the re-constructed form of the whole pole-piece 808.

Figure 9:
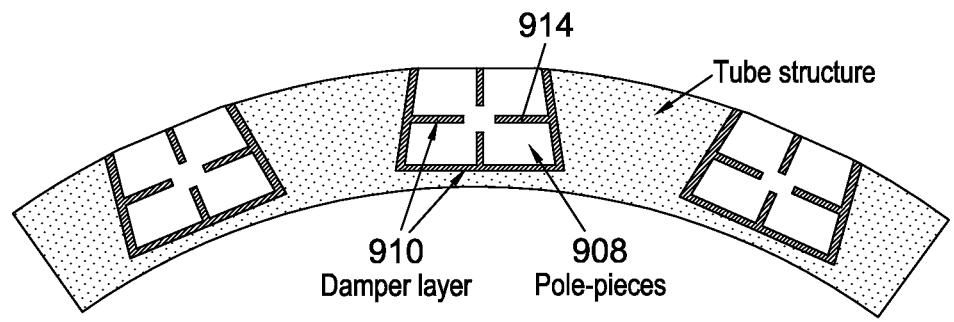
FIG. 9 is an axial view of another embodiment of a rotor for a magnetically geared apparatus.
Figure 10:
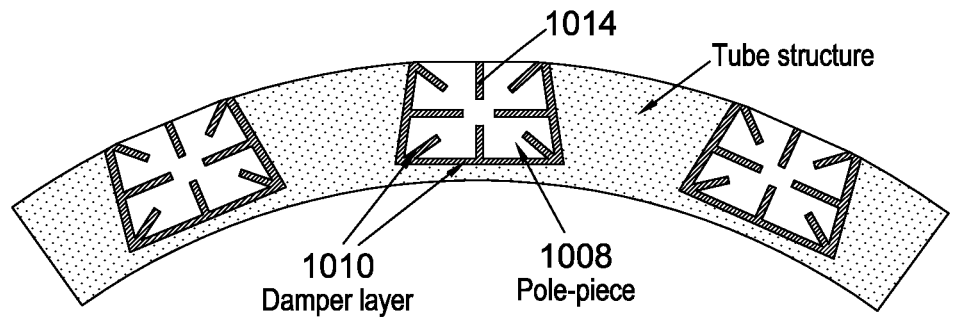
FIG. 10 is an axial view of another embodiment of a rotor for a magnetically geared apparatus.

As discussed in the above embodiments, a damper layer 210 may be provided between the pole-piece 208 and the slot wall as shown in FIG. 2. A damper layer 710, 810, 910 may be provided in the slots 714, 814, 914 of the pole-pieces 708, 808, 908 as shown in FIGS. 7, 8 and 9. In the embodiments shown in FIGS. 9 and 10, the pole-pieces 908, 1008 may be provided with slots 914, 1014 therein that extend to the periphery of the pole-piece 908, 1008, but the pole-piece 908, 1008 remains as a single part.

Any number of slots may be provided in a pole-piece. The slots may be filled with damping material (high loss factor material with low modulus).

The damper layer may be in the form of a tape. The damper layer may be in the form of a pourable fluid that is post-cured. The damper layer may be in the form of a mouldable putty or equivalent. The damper layer may be a single part injection-mould material such as a loaded rubber, visco-elastic, visco-plastic etc.

More than one type of damping material may be utilised in each slot, either layered (in series) or adjacent to each other (in parallel). As described above, using more than one type of damping material is advantageous as, due to the different properties of the damping materials, each damping material provides peak damping capability at a different temperature. Therefore, using more than one type of damping material provides damping over a wider temperature range. This is useful since typical applications will require the magnetically geared system (for example a magnetically geared motor/generator) to "start-up" from cold and operate without delay, such as rail propulsion, and then increase in temperature during operation.

In the embodiments of FIGS. 7 to 10, different damper materials may be used for a) the slots within the extents of the pole-piece shape, and b) the interface between the overall pole-piece form and the tube structure. The interface between the overall pole-piece form and the tube structure may require a higher modulus or higher bonding strength, whereas the slots within the pole-piece do not require this. As such, the damping material in the slots within the pole-piece could have a significantly lower modulus to improve damping. Therefore damping may be improved by using different damper materials in this manner as well.

Figure 11:
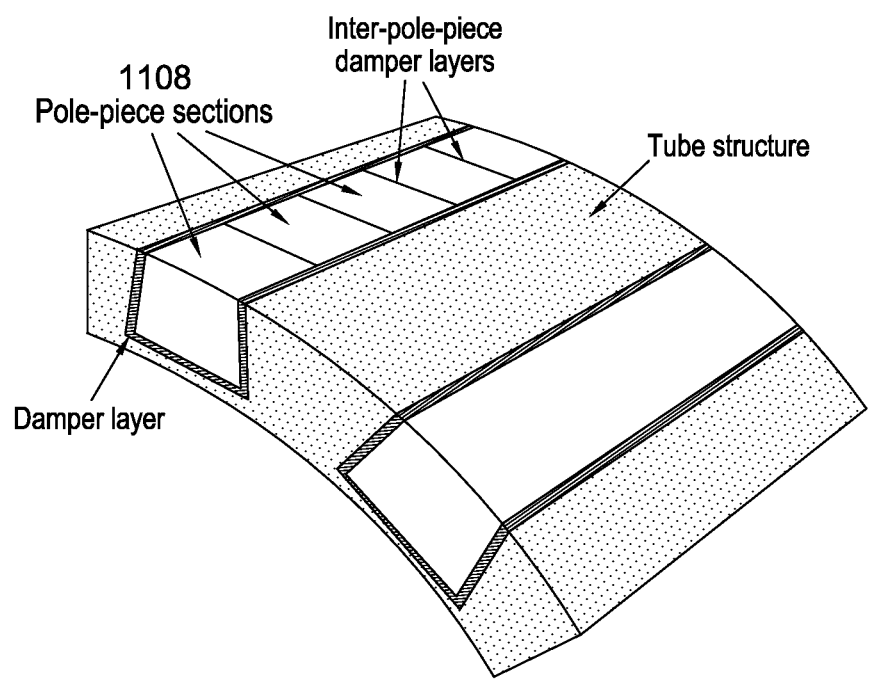
FIG. 11 is a perspective view of the rotor of any of FIGS. 2 and 7 to 10.

Each pole-piece may use a different damping material. Each pole-piece may use a number of different damping materials along the axial length, whether internal to the pole-piece (slots cut in the pole-pieces) or in the layer between the pole-piece and the tube structure. The pole-pieces may be a plurality of pole-pieces 1108 segmented in the z-direction as shown in FIG. 11. A damper layer may be introduced between the segments. By having a damper layer between segments, an increased surface area is provided to put in shear over the entire length of the pole-piece (i.e. the axial length of all pole-piece segments combined). The damper layer also acts to space the segments apart, thereby increasing magnetic reluctance in the z-direction. This increase in reluctance reduces flux leaking in the z-direction and ensures flux travels in the preferred radial direction.

If the pole-pieces are manufactured from thin laminations, a damper layer as previously described may be applied to the lamination before it is cut in the form of a thin damper coating. There will then be a damping layer between adjacent pole-piece laminations.

Figure 12:
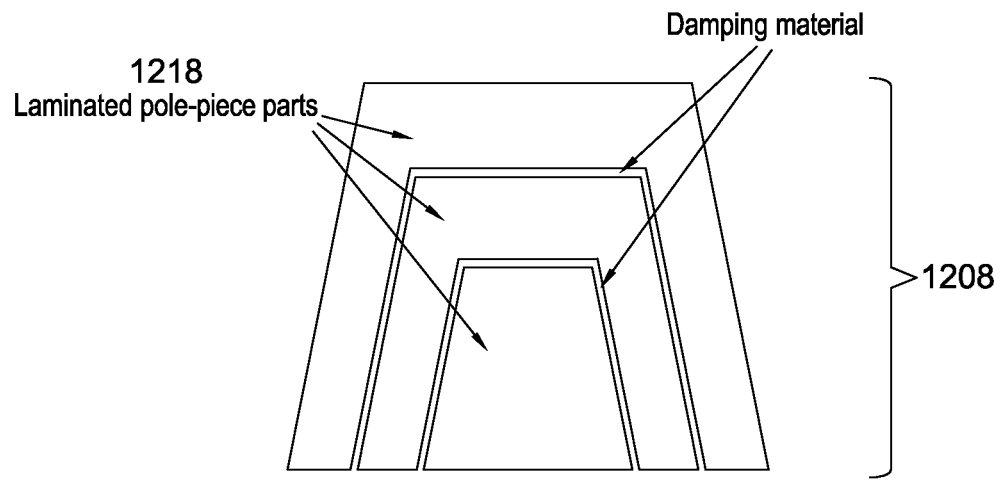
FIG. 12 is an axial view of an embodiment of a pole piece for the rotors of FIGS. 2, 4-11 and 13-15.

The pole-pieces may have a "Russian Doll" structure, as shown in FIG. 12. Such a pole-piece 1208 is formed from a series of individual pole-pieces 1218 layered radially and having complementary shapes. For example, a pole-piece 1208 may be formed of 3 pole-piece portions 1218: inner, middle and outer pole piece portions. The middle and outer pole-piece portions form successive shells over the inner pole piece portion, as shown in FIG. 12. Although 3 pole-piece portions 1218 are shown in FIG. 12, 2 or more than 3 pole-piece portions could be used.

As previously mentioned, the damper layers can be different materials. Referring to the pole-pieces of FIGS. 8-10 for example, each of these pole-pieces has a slot in its radially external surface (i.e. radially outer surface). In other words, the pole-pieces of these figures do not have a uniform section of low reluctance, pole-piece material at their radially external surface. Instead, the uniformity is broken by a slot containing damping material. Using a "Russian Doll" pole-piece structure however ensures that the radially external surface of the pole-piece is uniform/unbroken, while still allowing for multiple damper layers (between pole-piece portions and between the pole-piece and the slot wall) and a multi-part pole-piece. As a result of the lack of a slot in the radially external surface of the pole-piece 1218, a low reluctance path is provided in the circumferential direction, thereby promoting cross-linking flux from magnets radially external to the pole-piece rotor. This improves the electro-magnetic performance of a magnetically geared apparatus incorporating such a pole-piece, as a greater torque density will be developed compared to FIGS. 8-10. Additionally, as the pole-piece portions form successive shells, uniform/unbroken radial sections are also provided (see FIG. 12), which provides lower reluctance in the radial direction than provided by pole-pieces with one or more circumferential slots (see FIG. 8 showing slot 814, for example).

Conversely, the "Russian Doll" pole-piece of FIG. 12 is not uniform/unbroken at its radially internal surface (i.e. radially inner surface), which would face an inner rotor of a magnetically geared apparatus, thereby reducing eddy currents. Further, the "Russian Doll" pole-piece structure has an increased surface area in shear for a given volume of pole-piece, as would be understood.

The structure of the rotor itself will now be described. The rotor may be formed as a composite tube structure. The composite tube structure may be formed from either a filament winding or roll-wrap or other technique available to produce a tube. The lay of the fibres is controlled such that predominantly 45/−45 degree fibres (angled with respect to the XY plane, where the Z-axis of the tube is taken to be the centre of the tube axis) are used to form a first proportion of the thickness and predominantly 0/90 degree fibres (angled with respect to the XY plane) are used to form the remaining thickness of the tube. The 45 degree fibres extend in a first direction between a circumferential direction and an axial direction. Additionally or alternatively, the −45 degree fibres extend in a second direction between a circumferential direction and an axial direction. The 0 degree fibres extend in a third direction substantially along the circumferential direction. Additionally or alternatively, the 90 degree fibres extend in a fourth direction substantially along the axial direction.

The machined slots for the pole-pieces are cut to a pre-determined depth to leave a thickness of "torque tube" section at the bore of the tube which is left un-machined. The 45/−45 fibres may be a different material to the remaining thickness of the tube to provide a stronger and stiffer rotor, such as S-glass, Kevlar or Carbon-fibre etc. or a combination of these fibres.

A mandrel may be manufactured such that the cured diameter of the rotor bore is within the final tolerance required. This removes the need to machine the bore and risk cutting through some of the fibre layers in the torque tube (concentricity is maintained).

The machined slots may be trapezoidal or parallel or diamond-shaped, or any other shape that would provide mechanical keying as previously described. The pole pieces may be any corresponding shape in order to be keyed into the slots, such as trapezoidal, parallel or diamond-shaped, or any other shape.

The rotor may be a tube manufactured from two tubes with one nested coaxially and concentrically internal to the other.

Figure 13:
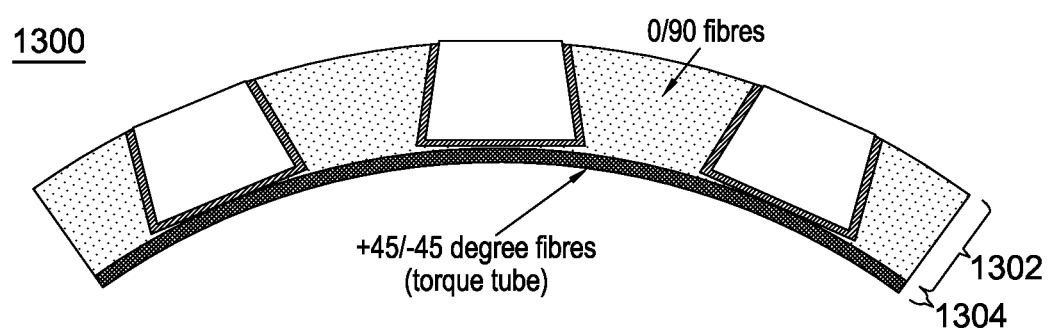
FIG. 13 is an axial view of another embodiment of a rotor for a magnetically geared apparatus.

In an embodiment shown in FIG. 13, a first composite tube structure 1302 of the rotor 1300 (outer part of the tube shown in FIG. 13) is manufactured from predominantly 0/90 fibres or a combination of fibres (including chopped strand) with a number of trapezoidal or diamond or parallel shaped slots that are cut all the way through the tube. An advantage of having 0/90 fibres in the first composite tube structure 1302 is that, when slots are machined into the first composite tube structure 1302, the slots cut through fewer fibres. As the skilled person would understand, the 90 degree fibres run parallel to the z-axis and therefore parallel to the slot length. As such, by having 0/90 fibres, more fibres are complete and uncut along their total fibre length.

Pole-pieces are mounted in the slot by inserting them from the inner bore of this first composite tube 1302. A second composite tube structure of the rotor 1304, manufactured from 45/−45 fibres, may be inserted at the bore of the first tube 1302 as shown in FIG. 13 (the tubes 1302, 1304 may be bonded or fixed together mechanically using screws or other means). The two tubes may be manufactured from different materials.

The fibres of the first composite tube structure 1302 may instead be a 3D weave having fibres penetrating in the radial direction. Such a weave is less susceptible to delamination than an 0/90 degree fibre configuration, and less susceptible to delamination than a 45/−45 degree fibre layup. Indeed, the weave is less susceptible to delamination than any layup predominantly in the theta plane of a polar coordinate system (XY plane of a Cartesian coordinate system, the Z axis being the axis of rotation of the rotor 1300). For example, such a 3D weave is less susceptible to delamination than a filament wind or roll-wrap, as these structures lack fibres penetrating the radial direction.

The second tube 1304 of FIG. 13 (the "torque tube") is manufactured from predominantly 45/−45 fibres, however other fibre lays are also possible. Any fibre lay that provides a useful torsional load transmission may be used in the second tube 1304, for example 30/−30 degree fibres or other angles.

Figure 14:
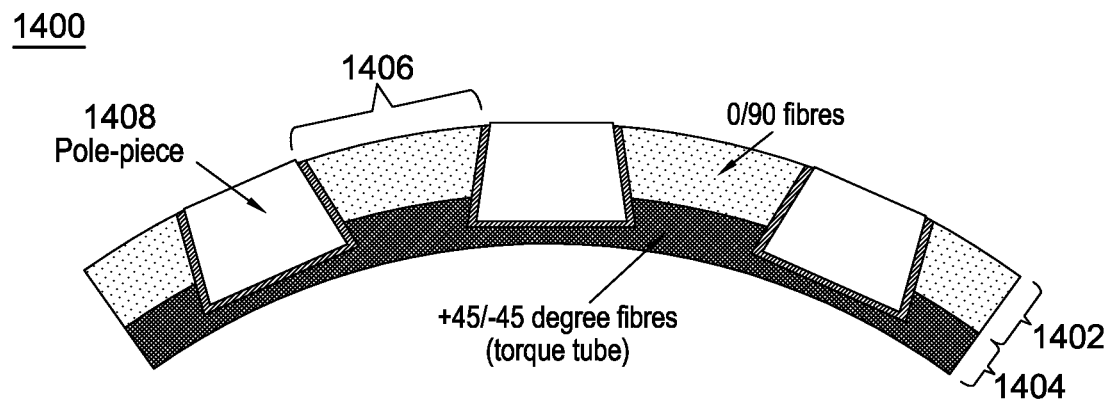
FIG. 14 is an axial view of another embodiment of a rotor for a magnetically geared apparatus.

In an embodiment shown in FIG. 14, the second tube 1404 is produced to a thickness extending from the bore of the rotor 1400 to a proportion of the full rotor thickness that is greater than the thickness of the torque tube of FIG. 13 (as shown in FIG. 14). This ensures that all fibres in the torque tube of FIG. 14 are 45/−45 degrees. A number of slots may be machined in the predominantly 45/−45 tube (second tube 1404) to a depth which results in the formation of the "torque tube" at the inner bore. This is typically from 0.3 to 10 mm depending on the size of the rotor. The slots may be parallel sided or trapezoidal. The pole-pieces are then placed/bonded in the slots.

In the embodiment of FIG. 14, wedge-shaped parts 1406 may be manufactured from composite material and then placed between the pole-pieces 1408 to provide mechanical keying. These parts may be manufactured from pressed composite plate with a predominantly 0/90 fibre direction layup. The wedge parts 1406 may be secured to the composite tube part (second tube 1404) using adhesive or mechanical fixings such as screws, rivets, etc. or a combination of these.

Figure 15:
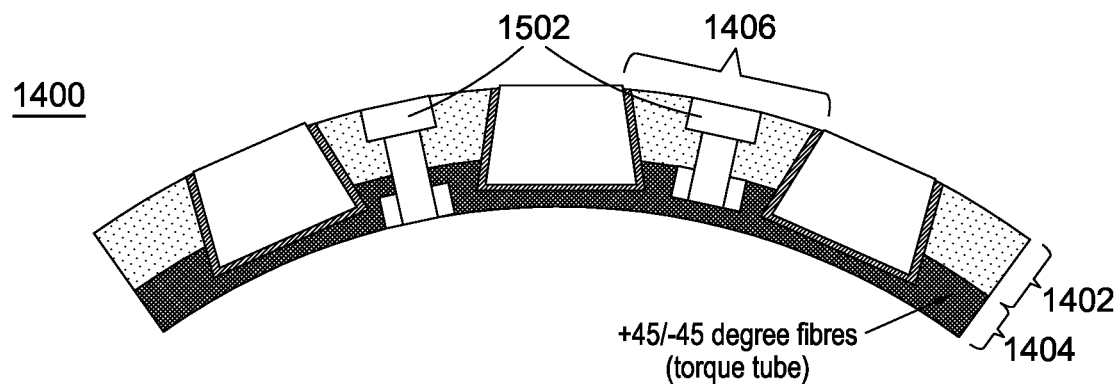
FIG. 15 is an axial view of another embodiment of a rotor for a magnetically geared apparatus.

In an embodiment, mechanical fixings may be in the form of those shown in FIG. 15, where (on the left hand side) a hole is made all the way through the rotor structure 1400 and a screw/nut combination is used to hold the structure (wedge parts 1406 and second tube 1404) together. Alternatively or additionally, the mechanical fixings 1502 may be as on the right hand side in FIG. 15, where a blind hole is made in the top surface of the composite tube structure (second tube 1404) and a hole is made all the way through the wedge parts 1406. A thread insert may be fitted in the blind hole in the top surface of the 45/−45 degree fibre tube structure (second tube 1404), and a screw from the top of the wedge part 1406 used to fix the parts together. The screws may be composite or metallic. Any number of screws may be used along the length of the rotor 1400.

An alternative method of fixing the composite wedges 1406 to the composite tube (second tube 1404) is to provide a number of trapezoidal features in the tube 1404 and slide a corresponding shaped wedge 1406 along the axis of the rotor (male/female dovetail joint). This may be a bonded joint or screwed together in a similar way to the options discussed for the embodiments of FIG. 15.

Aspects of an invention are disclosed in the following numbered clauses:

1. A magnetically geared apparatus comprising a rotor, the rotor comprising:
    a ring structure;
   wherein at least a portion of the ring structure is formed from composite material comprising: a first plurality of fibres extending substantially in a first direction and a second plurality of fibres extending substantially in a second direction, the first direction and the second direction being non-parallel and the first direction and/or second direction being between a circumferential direction and an axial direction.
2. The magnetically geared apparatus of clause 1, wherein the ring structure is an inner ring structure, and wherein the rotor further comprises an outer ring structure that is radially outer, the second ring structure having a pole piece-receiving portion therein.
3. The magnetically geared apparatus of clause 2, wherein the inner and outer ring structures are concentric.
4. The magnetically geared apparatus of clause 2 or 3, wherein the pole piece-receiving portion comprises walls extending radially through the outer ring structure.
5. The magnetically geared apparatus of clause 4, wherein the walls extend radially through the entirety of a radial width of the outer ring structure.
6. The magnetically geared apparatus of any preceding clause, wherein the first and second crossed fibres form a layer in the inner ring structure.
7. The magnetically geared apparatus of any of clauses 2 to 6, wherein the outer ring structure is formed from composite material comprising a third plurality of fibres extending substantially in a third direction different from the first and/or second directions.
8. The magnetically geared apparatus of clause 7, wherein the outer ring structure further comprises a fourth plurality of fibres, the third and fourth plurality of fibres being aligned in respective third and fourth orientations, at least one of the third and fourth orientations being different to the first and second orientations.
9. The magnetically geared apparatus of clause 8, wherein at least one of the third and fourth orientations is aligned substantially along the axial direction.
10. The magnetically geared apparatus of clause 9, wherein the other of the third and fourth orientations is aligned substantially along the circumferential direction.
11. The magnetically geared apparatus of any of clauses 8 to 10, wherein the third and fourth orientations are separated by an angle of substantially 90°.
12. The magnetically geared apparatus of clause 7, wherein the third plurality of fibres comprise chopped strands of fibres.
13. The magnetically geared apparatus of clause 7, wherein at least one of the third plurality of fibres extends at least partly, and optionally substantially, radially.
14. The magnetically geared apparatus of clause 13, wherein the third plurality of fibres form a three-dimensional weave.
15. The magnetically geared apparatus of any preceding clause, wherein the axis of rotation of the rotor defines a Z axis, and wherein the first orientation is between 0° and 90° with respect to the XY plane, and the second orientation is between 0° and −90° with respect to the XY plane.
16. The magnetically geared apparatus of clause 15, wherein the first orientation is between 5° and 85°, and optionally the second orientation is between −5° and −85°.
17. The magnetically geared apparatus of clause 16, wherein the first orientation is between 10° and 80°, and optionally the second orientation is between −10° and −80°.
18. The magnetically geared apparatus of clause 17, wherein the first orientation is between 15° and 75°, and optionally the second orientation is between −15° and −75°.
19. The magnetically geared apparatus of clause 18, wherein the first orientation is between 30° and 60°, and optionally the second orientation is between −30° and −60°.
20. The magnetically geared apparatus of any of clauses 15 to 19, wherein the first orientation is substantially 45°, and the second orientation is substantially −45°.
21. The magnetically geared apparatus of any preceding clause, wherein the first and second orientations are separated by an angle of substantially 90°.
22. The magnetically geared apparatus of any of clauses 4 to 21, wherein the walls do not extend into the inner ring structure.
23. The magnetically geared apparatus of any of clauses 4 to 21, wherein the walls extend part of the way through a radial width of the inner ring structure.
24. The magnetically geared apparatus of any of clauses 2 to 23, wherein the pole piece-receiving portion has a length and a width, the length being greater than the width, and the length extending in the axial direction.
25. The magnetically geared apparatus of any preceding clause, wherein the rotor is formed from a filament winding, a roll-wrap or a resin-transfer mould technique.
26. The magnetically geared apparatus of clauses 7 to 25, wherein the fibres of the inner ring structure and the outer ring structure are different materials.

27. The magnetically geared apparatus of any preceding clause, wherein the fibres of the inner ring structure are E-glass, S-glass, Kevlar, Carbon-fibre or natural fibres.
28. The magnetically geared apparatus of any of clauses 2 to 27, wherein the inner ring structure is radially internal to the outer ring structure.
29. The magnetically geared apparatus of any of clauses 2 to 28, wherein the inner and outer ring structures are bonded or mechanically fixed together.
30. The magnetically geared apparatus of any of clauses 2 to 29, wherein the inner and outer ring structures comprise a screw passing radially through the inner and outer ring structures, and a nut on one end of the screw to mechanically fix the inner and outer ring structures together.
31. The magnetically geared apparatus of any of clauses 2 to 30, wherein the inner and outer ring structures comprise a screw passing radially through the outer ring structure into a blind hole in the inner ring structure, thereby mechanically fixing the inner and outer ring structures together.
32. The magnetically geared apparatus of any of clauses 2 to 31, wherein the pole piece-receiving portion receives at least one pole piece therein.
33. The magnetically geared apparatus of clause 32, wherein a surface of the at least one pole piece forms at least part of the radially outer surface of the rotor.
34. The magnetically geared apparatus of clause 32 or 33, wherein the pole piece-receiving portion and the at least one pole piece are shaped to provide a mechanical keying of the at least one pole piece in the pole piece-receiving portion.
35. The magnetically geared apparatus of clause 34, wherein the mechanical keying is such that outward radial movement of the at least one pole piece is restricted.
36. The magnetically geared apparatus of any of clauses 4 to 35, wherein the walls comprises a circumferential spacing therebetween, the walls being inclined towards the radially inner surface.
37. The magnetically geared apparatus of any of clauses 30 to 36, wherein the pole piece-receiving portion has a cross section in a plane substantially perpendicular to the axis of rotation of the rotor that is substantially trapeziform, and the at least one pole piece has a cross section in a plane substantially perpendicular to the axis of rotation of the rotor that is substantially trapeziform.
38. The magnetically geared apparatus of any of clauses 30 to 36, wherein the pole piece-receiving portion has a cross section in a plane substantially perpendicular to the axis of rotation of the rotor that is substantially diamond-shaped, and the at least one pole piece has a cross section in a plane substantially perpendicular to the axis of rotation of the rotor that is substantially diamond-shaped.
39. The magnetically geared apparatus of any of clauses 4 to 35, wherein the walls comprise a circumferential spacing therebetween, the pole piece-receiving portion further comprising a wedge between one or both of the walls and the at least one pole piece.
40. The magnetically geared apparatus of clause 39, wherein the wedge has a radially extending wall inclined towards the radially inner surface.
41. The magnetically geared apparatus of any of clauses 2 to 40, wherein the rotor further comprises damping material and wherein, when the damping material is at a temperature within a range of 0° C. to 150° C., the damping material has a loss factor greater than 0.1.
42. The magnetically geared apparatus of clause 41, wherein the loss factor is greater than 1.
43. The magnetically geared apparatus of clause 41 or 42, wherein, when the damping material is at a temperature within the range, the damping material has a Young's modulus between 1 MPa and 100 MPa, and optionally a Young's modulus between 1 MPa and 30 MPa.
44. The magnetically geared apparatus of any of clauses 41 to 43, wherein the damping material is provided between at least one pole piece received in the pole piece-receiving portion and the pole piece-receiving portion.
45. The magnetically geared apparatus of clause 44, wherein the damping material is provided between radially extending walls of the at least one pole piece and the walls of the pole piece-receiving portion.
46. The magnetically geared apparatus of clause 44 or 45, wherein the damping material is provided between a radially inner surface of the pole piece and the pole piece-receiving portion.
47. The magnetically geared apparatus of any of clauses 44 to 46, wherein the damping material comprises a tape, a post-cured pourable fluid, a mouldable putty, a loaded rubber, a visco-elastic or a visco-plastic.
48. The magnetically geared apparatus of any of clauses 44 to 46, wherein the damping material comprises a plurality of different materials having different values of the loss factor and/or the Young's modulus.
49. The magnetically geared apparatus of clause 48, wherein the different materials are axially or circumferentially or radially layered.
50. The magnetically geared apparatus of any of clauses 41 to 49, wherein the damping material is provided in a cavity of at least one pole piece.
51. The magnetically geared apparatus of clause 50, wherein the cavity is completely enclosed by the pole piece.
52. The magnetically geared apparatus of clause 50, wherein the cavity is in communication with an exterior of the pole piece.
53. The magnetically geared apparatus of any of clauses 50 to 52, wherein the cavity comprises a slot extending towards a surface of the at least one pole piece.
54. The magnetically geared apparatus of clause 53, wherein the slot comprises a first slot extending radially, and a second slot extending circumferentially.
55. The magnetically geared apparatus of any of clauses 50 to 54, wherein the cavity comprises a diagonal slot oblique to the radial direction.
56. The magnetically geared apparatus of clause 50, wherein the cavity comprises one or more internal slots, each slot dividing the at least one pole piece into a plurality of pole pieces.
57. The magnetically geared apparatus of clause 56, wherein the plurality of pole pieces are enclosed by the damping material.
58. The magnetically geared apparatus of any of clauses 32 to 57, wherein the at least one pole piece comprises a laminated pole piece.
59. The magnetically geared apparatus of clause 58, wherein the laminated pole piece is formed of laminate sheets layered axially or radially.
60. The magnetically geared apparatus of any of clauses 41 to 57, wherein rotor comprises at least one pole piece received in the pole piece-receiving portion, the at least one pole piece comprising a laminated pole piece formed of laminate sheets layered axially or radially, the pole piece further comprising the damping material between the laminate sheets.

61. The magnetically geared apparatus of any of clauses 32 to 57, wherein the at least one pole piece is a soft magnetic composite.

62. The magnetically geared apparatus of any of clauses 32 to 61, wherein the at least one pole piece comprises a plurality of axially adjacent pole pieces.

63. The magnetically geared apparatus of any of clauses 32 to 62, wherein the rotor comprises at least one pole piece received in the pole piece-receiving portion, the at least one pole piece comprising a plurality of axially adjacent pole pieces, the pole piece further comprising the damping material between the axially adjacent pole pieces.

64. The magnetically geared apparatus of any of clauses 32 to 63, wherein the at least one pole piece comprises a plurality of pole piece portions, the pole piece portions being radially layered on top of each other.

65. The magnetically geared apparatus of clause 64, wherein the pole piece portions comprise inner and outer pole piece portions, the outer pole piece portion forming a shell radially outer of the inner pole piece portion.

66. The magnetically geared apparatus of clause 64 or 65, wherein the plurality of pole piece portions comprises 2 or more pole piece portions.

67. The magnetically geared apparatus of clause 66, wherein the plurality of pole piece portions comprises 3 pole piece portions.

68. The magnetically geared apparatus of any preceding clause, wherein the rotor comprises first and second end plates at opposite axial ends of the rotor, the first and second end plates being fixed to the ring structure.

69. The magnetically geared apparatus of any preceding clause, wherein the first ring structure is of one-piece construction.

70. The magnetically geared apparatus of any of clauses 2 to 69, wherein the first and second ring structures are of one-piece construction.

71. The magnetically geared apparatus of any preceding clause, wherein the apparatus further comprises:
another rotor comprising a first plurality of permanent magnets;
a stator comprising a second plurality of permanent magnets and windings;
wherein the rotor is arranged to interact with the another rotor in a magnetically geared manner; and wherein the windings are arranged to magnetically interact with the first or fundamental harmonic of the magnetic field of the first plurality of permanent magnets.

72. The magnetically geared apparatus of clause 71, wherein the rotor has at least one pole piece, the first plurality of permanent magnets has a respective first number of pole-pairs, and the second plurality of permanent magnets has a respective second number of pole-pairs, wherein the at least one pole piece is arranged to modulate the magnetic fields of the first and second pluralities of permanent magnets to produce mutually matching pole-pairs, thereby enabling magnetic coupling and torque transmission between the first and second pluralities of permanent magnets, and wherein the windings are arranged to magnetically couple with the first or fundamental harmonic of the magnetic field of the first plurality of permanent magnets.

73. The magnetically geared apparatus of any preceding clause, wherein the rotor and another rotor are configured to transfer torque therebetween in a magnetically geared manner.

74. The magnetically geared apparatus of clause 73, wherein first rotor is mechanically coupled to one of an input or output shaft, and the another rotor is mechanically coupled to the other of an input or output shaft.

75. A rotor according to any preceding clause.

The invention claimed is:

1. A magnetically geared apparatus comprising a rotor having a first axial end and a second axial end, the rotor comprising:
a tube structure extending axially between the first axial end and the second axial end;
wherein at least a portion of the tube structure is formed from composite material comprising: a first plurality of fibres extending substantially in a first direction and a second plurality of fibres extending substantially in a second direction, the first direction and the second direction being non-parallel with one another, and being between a circumferential direction and an axial direction.

2. The magnetically geared apparatus of claim 1, wherein the tube structure is an inner tube structure, and wherein rotor further comprises an outer tube structure that is radially outer, the outer tube structure having a pole piece-receiving portion therein.

3. The magnetically geared apparatus of claim 2, wherein the outer tube structure is formed from composite material comprising a third plurality of fibres extending substantially in a third direction different from the first and/or second directions.

4. The magnetically geared apparatus of claim 3, wherein the outer tube structure further comprises a fourth plurality of fibres, the third plurality of fibres and the fourth plurality of fibres being aligned in respective third and fourth directions, at least one of the third and fourth directions being different than the first and second directions.

5. The magnetically geared apparatus of claim 4, wherein one of the third and fourth directions is aligned substantially along the axial direction, and the other of the third and fourth directions is aligned substantially along the circumferential direction.

6. The magnetically geared apparatus of claim 4, wherein the third and fourth directions are separated by an angle of substantially 90°.

7. The magnetically geared apparatus of claim 2, wherein the inner and outer tube structures are mechanically fixed together.

8. The magnetically geared apparatus of claim 1, wherein an axis of rotation of the rotor defines a Z axis, and wherein the first direction is between 0° and 90° with respect to an XY plane, and the second direction is between 0° and −90° with respect to an XY plane.

9. The magnetically geared apparatus of claim 1, wherein the first direction is substantially 45°, and the second direction is substantially −45°.

10. The magnetically geared apparatus of claim 1, wherein the first and second directions are separated by an angle of substantially 90°.

11. The magnetically geared apparatus of claim 1, wherein the rotor comprises first and second end plates at opposite axial ends of the rotor, the first and second end plates being fixed to the tube structure.

12. The magnetically geared apparatus of claim 1, wherein the magnetically geared apparatus further comprises:
    another rotor comprising a first plurality of permanent magnets;
    a stator comprising a second plurality of permanent magnets and windings;
    wherein the rotor is arranged to interact with the another rotor in a magnetically geared manner; and
    wherein the windings are arranged to magnetically interact with the first or fundamental harmonic of a magnetic field of the first plurality of permanent magnets.

13. The magnetically geared apparatus of claim 12, wherein first plurality of permanent magnets has a respective first number of pole-pairs, and the second plurality of permanent magnets has a respective second number of pole-pairs, and
    wherein the at least one pole piece is arranged to modulate magnetic fields of the first and second pluralities of permanent magnets to produce mutually matching pole-pairs, thereby enabling magnetic coupling and torque transmission between the first and second pluralities of permanent magnets, and wherein the windings are arranged to magnetically couple with the first or fundamental harmonic of the magnetic field of the first plurality of permanent magnets.

14. The magnetically geared apparatus of claim 12, wherein the rotor and the another rotor are configured to transfer torque therebetween in a magnetically geared manner.

15. The magnetically geared apparatus of claim 12, wherein first rotor is mechanically coupled to one of an input or output shaft, and the another rotor is mechanically coupled to the other of an input or output shaft.

16. A rotor comprising the magnetically geared apparatus of claim 1.

17. The magnetically geared apparatus of claim 1, wherein the tube structure comprises a single composite tube with one or more machined slots.

18. The magnetically geared apparatus of claim 17, wherein the one or more machined slots are lined with a damper layer.

* * * * *